US007046305B1

(12) United States Patent
Miller et al.

(10) Patent No.: US 7,046,305 B1
(45) Date of Patent: May 16, 2006

(54) METHOD AND APPARATUS FOR ENHANCING GREEN CONTRAST OF A COLOR VIDEO SIGNAL

(75) Inventors: Rick Wayne Miller, Carmel, IN (US); Eric Stephen Carlsgaard, Zionsville, IN (US); Karl Francis Horlander, Indianapolis, IN (US)

(73) Assignee: Thomson Licensing, Boulogne (FR)

( * ) Notice: Subject to any disclaimer, the term of this patent is extended or adjusted under 35 U.S.C. 154(b) by 347 days.

(21) Appl. No.: 10/129,494

(22) PCT Filed: Nov. 16, 2000

(86) PCT No.: PCT/US00/31553

§ 371 (c)(1),
(2), (4) Date: May 6, 2002

(87) PCT Pub. No.: WO01/37577

PCT Pub. Date: May 25, 2001

Related U.S. Application Data (60) Provisional application No. 60/166,141, filed on Nov. 18, 1999.

(51) Int. Cl.
*H04N 9/66* (2006.01)
*H04N 9/68* (2006.01)
*H04N 9/70* (2006.01)

(52) U.S. Cl. .................. 348/652; 348/638; 348/644; 348/645

(58) Field of Classification Search ............ 348/638, 348/644–649, 651–654; H04N 9/66, 9/68, H04N 9/70
See application file for complete search history.

(56) References Cited

U.S. PATENT DOCUMENTS 3,662,097 A  5/1972  Rennick ............... 178/5.4

(Continued)

FOREIGN PATENT DOCUMENTS

EP       221354        5/1987

OTHER PUBLICATIONS

Lee et al. "Favorite Color Correction for Reference Color", ieee Transaction on Consumer Electronics, vol. 44, No. 1, Feb. 1998.*

*Primary Examiner*—Brian P. Yenke
(74) *Attorney, Agent, or Firm*—Joseph J. Laks; Robert D. Shedd; William A. Lagoni (57) ABSTRACT

Method and apparatus for automatically enhancing the foliage display of a color signal includes providing the color signal in multiplexed form having alternating first and second components, the first component being substantially aligned with a flesh tone color space axis, the second component being substantialy aligned with a green tone color space axis. A de-multiplexing unit separates the first and second components to provide a first de-multiplexed component substantially aligned with the flesh tone axis and a second de-multiplexed component substantially aligned with the green tone axis. A processing unit generates from the de-multiplexed components a green tone enhancement control signal for increasing green tone contrast of the color signal; and a modifying unit modifies the magnitude of the multiplexed color signal by applying the multiplexed color signal and the green tone enhancement control signal to a multiplier to provide a modified multiplexed output signal at an output having enhanced foliage contrast. In an examplary embodiment, the green enhancement control signal and a flesh tone enhancement control signal are applied to a common multiplier thereby advantageously providing both flesh tone and foliage enhancement with an absolute minimum of circuitry for the combined functions.

13 Claims, 10 Drawing Sheets

U.S. PATENT DOCUMENTS

| | | | |
|---|---|---|---|
| 3,852,807 A * | 12/1974 | Caprio et al. | 348/652 |
| 3,996,608 A | 12/1976 | Harwood | 358/28 |
| 4,051,510 A | 9/1977 | Cochran | 358/28 |
| 4,091,411 A | 5/1978 | Sanada et al. | 358/28 |
| 4,183,048 A | 1/1980 | Isono et al. | 358/28 |
| 4,197,556 A | 4/1980 | Isono et al. | 358/28 |
| 4,544,944 A | 10/1985 | Chin | 358/28 |
| 4,554,576 A | 11/1985 | Kao | 358/28 |
| 4,558,351 A | 12/1985 | Fling et al. | 358/28 |
| 4,644,389 A | 2/1987 | Nakagawa et al. | 358/28 |
| 4,679,072 A | 7/1987 | Takayama | 358/80 |
| 4,695,875 A | 9/1987 | Kishi | 358/28 |
| 4,750,050 A | 6/1988 | Belmares-Sarabia et al. | 358/311 |
| 4,788,586 A | 11/1988 | Eckenbrecht | 358/28 |
| 5,333,070 A | 7/1994 | Ichikawa | 358/518 |
| 5,798,801 A | 8/1998 | Skinner | 348/645 |

* cited by examiner

METHOD AND APPARATUS FOR ENHANCING GREEN CONTRAST OF A COLOR VIDEO SIGNAL

This application claims the benefit under 35 U.S.C. § 365 of International Application PCT/US00/31553, filed Nov. 16, 2000, which was published in accordance with PCT Article 21(2) on May 25, 2001 in English; and which claims benefit of U.S. provisional application Ser. No. 60/166,141 filed Nov. 18, 1999.

This invention relates to automatic color correction of a video signal, and in particular, to automatic enhancement of selected parameters of a color video signal, such as hue and saturation.

It is known, generally, to automatically correct for color errors in the flesh tones of displayed images. An example of such a system is described, for example, by Harwood in U.S. Pat. No. 3,996,608 entitled HUE CORRECTION APPARATUS HAVING A RESTRICTED RANGE, which issued 7 Dec. 1976. In the Harwood apparatus, chrominance signals are monitored on an dynamic basis and the phase of a color subcarrier reference signal is automatically altered when the chrominance signals are in the vicinity of the flesh tone (+I) axis. The phase of the reference subcarrier is altered, making use of a wide bandwidth phase detector, by controllably adding a portion of an amplitude limited chrominance signal to the subcarrier so as to shift the subcarrier phase towards the phase of the chrominance signal. The range of angles and response of the apparatus is restricted by means of an offset bias control coupled to the chrominance signal adder circuit.

Another example of automatic hue correction of flesh tones is described by Cochran in U.S. Pat. No. 4,051,510 entitled HUE CORRECTION APPARATUS CONTROLLED BY CHROMINANCE SATURATION, which issued 27 Sep. 1977. The Cochran apparatus provides a reduction in flesh tone hue correction as a function of chrominance signal level. Chrominance signals are monitored on a dynamic basis and the phase of a color subcarrier reference signal is automatically altered when the chrominance signals are in the vacinity of the flesh tone (+I) axis. The phase of the reference subcarrier is altered by controllably adding a portion of an amplitude limited chrominance signal to the subcarrier so as to shift the subcarrier phase towards the phase of the chrominance signal. A normal phase correction range of the apparatus is controllably inhibited in the presence of relatively large amplitude chrominance signals representative of saturated colors.

A further example of automatic color correction of flesh tones is described by Lewis, Jr. et al. in U.S. Pat. No. 4,528,586, entitled AUTOMATIC TINT CORRECTION WITH REDUCED COLOR SATURATION ERROR, which issued 9 July 1985. In Lewis, Jr. et al., color saturation errors associated with flesh tone correction circuits are corrected by adding the absolute value of a fraction of one of the color mixture signals to the color mixture signal in quadrature phasing therewith.

The present invention is directed to solving certain problems here-to-fore not recognized in the prior art. The new problem is directed to providing a digital color space enhancement method and apparatus having a relatively low cost, low die area, mechanism for automatically adjusting tint or hue and the color level and saturation of a video image being displayed.

An object of the present invention is to automatically enhance the rendition of trees and other foliage in displayed images to achieve a more vibrant color display of such objects. Advantageously the principles of the invention are applicable for improving color rendition of video images whether they are from a conventional NTSC source, a digital SD/HD broadcast or a satellite source. The method and apparatus improves both the appearance of foliage and the hue of flesh tones, making them look more natural, but with very little distortion of non-flesh hues such as yellow and magenta. The improvement in the saturation of green hues makes them look more vibrant. This is achieved with minimal distortion of non-flesh hues such as yellows and yellow-greens of landscape and foliage scenes. By contrast, the known forms of conventional TV circuits, designed to correct NTSC color errors for flesh tones tend to produce significant distortions of non-flesh tone hues. It is herein recognized that an undesired side effect of the prior art circuits tends to cause Spring time foliage scenes to appear as Autumn or Fall foliage scenes.

U.S. Pat. No. 5,333,070 discloses an apparatus for adjusting the color characteristics of a video signal using a matrix circuit that is controlled in response to user adjustment of a set of color correction controls. Specifically, the color adjustment is performed by multiplying the RGB signals derived from the video signal with a three-row, three-column color correction matrix. By adjusting the color correction controls, the user can adjust the coefficients of the color correction matrix applied to the color signal thereby freely adjust the characteristics of specific colors.

In advantageous embodiments of the invention herein disclosed, an improvement is provided in the saturation of flesh tones that are low. This improves the appearance of people in video images where the signal has an inappropriately low chroma to luma ratio.

Of particular significance, the method and apparatus of the present invention improves the color separation or contrast of brown and green hues, making plants and trees in a forest scenes look more realistic than they would in unprocessed video. Further, the present invention includes control functions such as tint and saturation, each of which is implemented using single multipliers. This is a significant simplification from the usual requirement of a several multipliers for the two operations using conventional means.

A method, in accordance with the present invention, comprises the steps of: receiving a color signal; and generating first and second signal components from the color signal, the first signal component being substantially aligned with a flesh tone color axis, the second signal component being substantially aligned with a green tone color axis, characterized by modifying the first and second signal components to increase the magnitude of the color signal around the vicinity of the green tone color axis to provide green tone enhancement thereby improving the contrast of foliage displayed in an image generated from the color signal.

Apparatus, in accordance with the present invention, comprises: means for receiving a color signal; and means, coupled to the receiving means, for generating first and second signal components from the color signal, the first signal component being substantially aligned with a flesh tone color axis, the second signal component being substantially aligned with a green tone color space axis, characterized by means, coupled to the generating means, for modifying the first and second signal components to increase the magnitude of the color signal around the vicinity of the green tone color space axis to provide enhanced green tone thereby improving the contrast of foliage displayed in an image generated from the color signal.

The foregoing and further features of the invention are illustrated in the accompanying drawings in which like elements are designated by like designations, wherein.

In the following description, digital data is presented in 2's complement notation unless otherwise noted. Also, clocked delays are signified in the drawing by boxes containing triangles and a multiplier factor "X" which indicates the number of delay intervals. The delays are used to ensure proper alignment of color difference signals (Cr and Cb) which are in multiplexed form. Also, binary arithmetic shift operations are indicated by boxes containing the symbol "<<" which indicates a binary shift left and the symbol ">>" which indicates a binary shift right. The shift symbols are always followed by a number indicating the number of bits of the shift. The shift operations are used, as will be explained, to provide division or to prevent overflow during the various digital operations.

Figure 1:
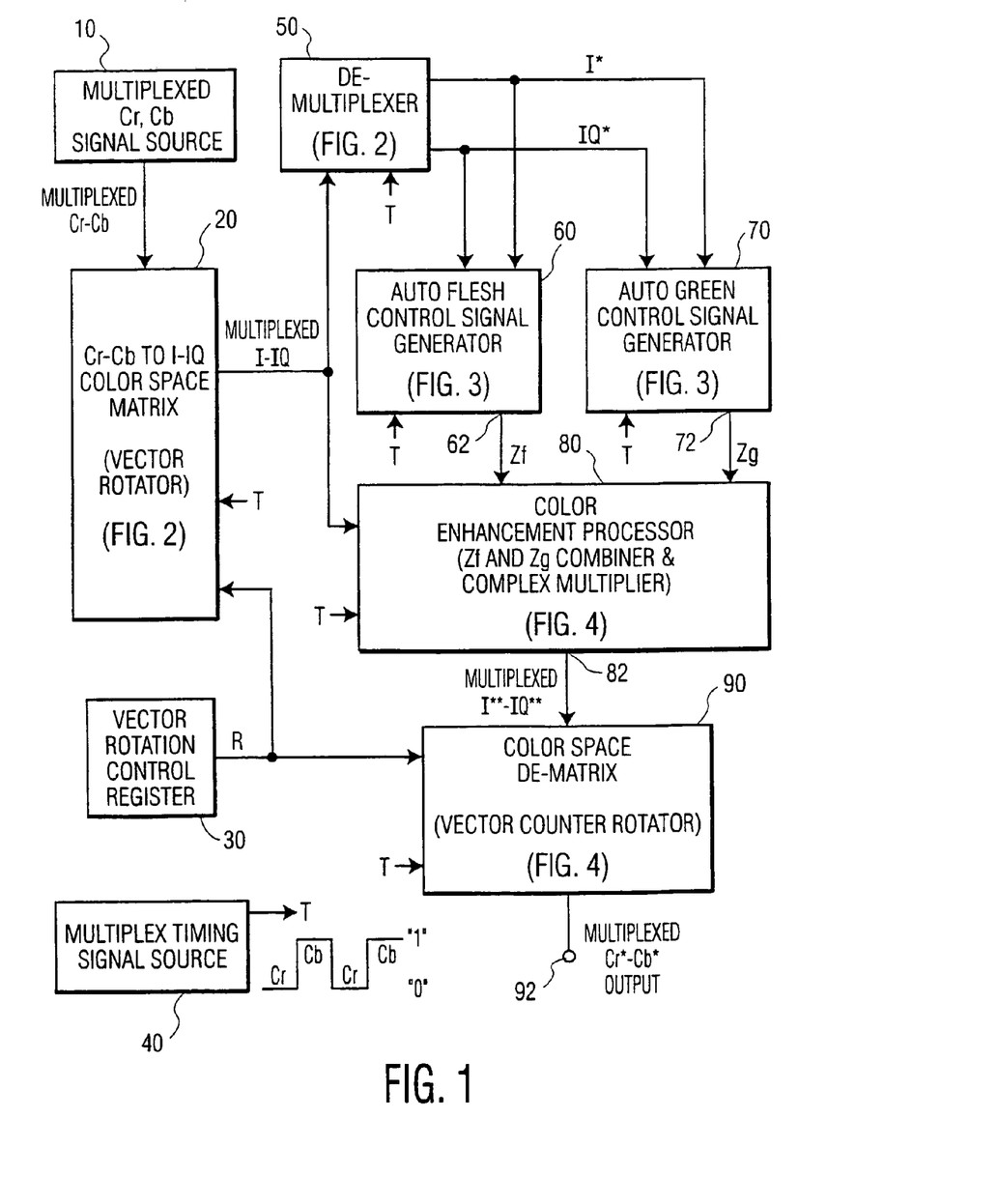
FIG. 1 is a block diagram of a video system embodying the invention.

In FIG. 1, source 10 provides a pair of multiplexed digital color difference signals Cr and Cb to be enhanced for foliage contrast improvement and, in this embodiment, flesh tone contrast as well. The multiplexed Cr and Cb signals are applied to vector rotator 20. Vector rotator 20 is also designated in the drawing as a Cr-Cb to I-IQ color space matrix. In conventional digital TV or VCR systems, the color difference signals are generally not aligned with the flesh tone axis "I" and the quadrature flesh tone axis "IQ". The function of vector rotator 20 is to rotate the components Cr-Cb to an I-IQ color space for further processing. Vector rotator 20 performs this function under the control of rotation control register 30 which provides rotation control signal R. Signal R rotates vectors Cr and Cb into alignment with the flesh tone axis "I" and the quadrature flesh tone axis "IQ."

To rotate the multiplexed digital signals, vector rotator 20 also receives timing control signal T from multiplex timing signal source 40. Signal T is low when the digital color component signal Cr is present and is high when the digital color component signal Cb is present as shown in FIG. 1. Of course, the high and low states may be reversed in a particular application. Timing control signal T ensures that the Cr multiplexed samples are properly aligned with other Cr samples, and the same is true for the Cb samples. Timing control signal T of source 40 is also provided to other elements of the apparatus, as illustrated by the arrows T, to perform similar Cr-Cb alignment.

The output of vector rotator 20 comprises multiplexed Cr-Cb color difference signals rotated into alignment with the I-IQ color space. The rotated, multiplexed signals I-IQ are fed to de-multiplexer 50 and color enhancement processor 80. De-multiplexer 50 de-multiplexes the I-IQ signals to provide de-multiplexed I* and IQ* output signals to auto flesh control signal-generator 60 and to auto green control signal generator 70. Control signal generators 60 and 70 also receive timing signal T from source 40 for maintaining timing relations as noted above.

Control signal generators 60 and 70 provide respective control signals Zf and Zg for enhancing flesh tones and foliage tones (greens), respectively. Auto flesh control signal generator 60 generates from the de-multiplexed components a flesh tone enhancement control signal that compresses flesh tones of the color signal which are overly red or green. This is illustrated by the three dimensional plot of FIG. 5 which shows an IRE cutoff of about +5 IRE units for flesh tone processing. Auto green control signal generator 70 generates from the de-multiplexed components a green tone enhancement control signal for increasing green tone contrast of the color signal. Details of control signal generators 60 and 70 are shown in FIG. 3 and discussed further below.

Figure 4:
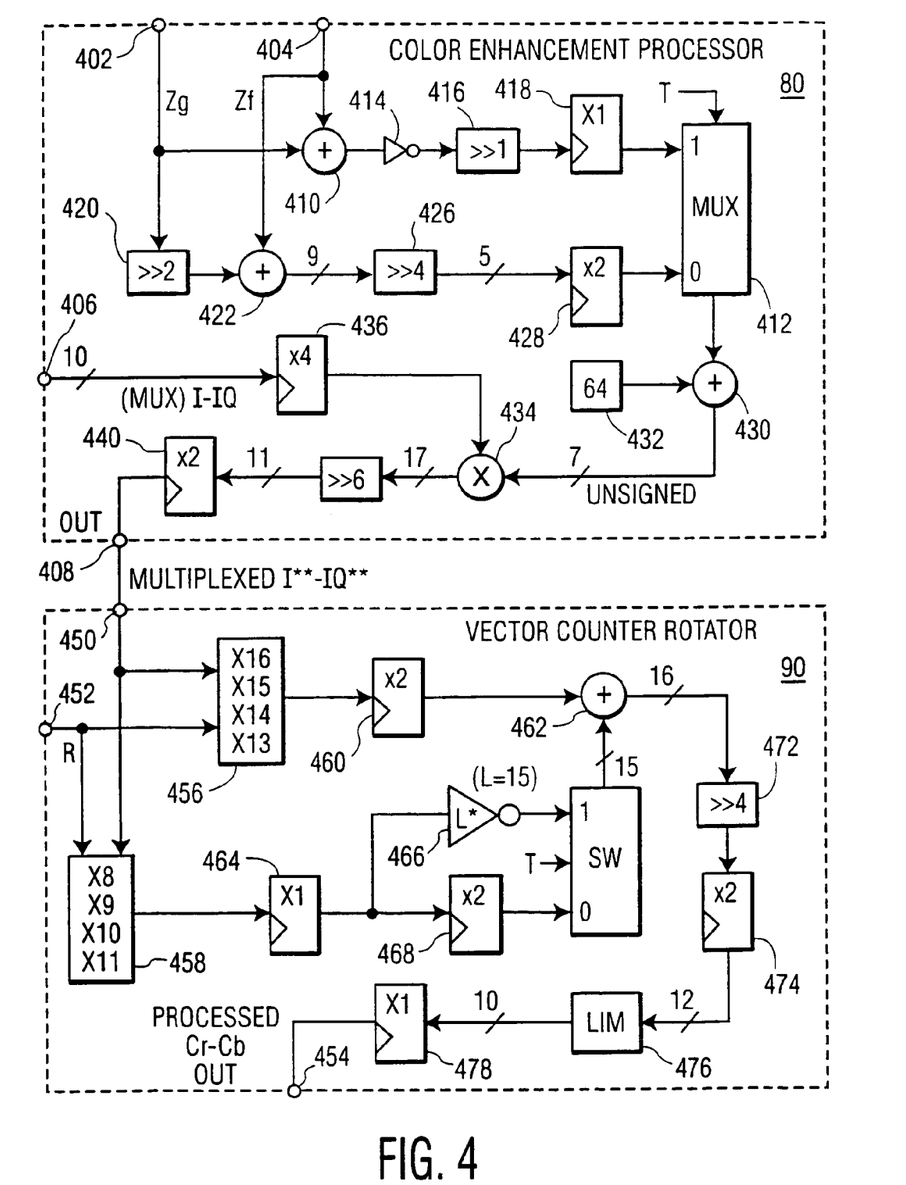
FIG. 4 is a detailed exemplary circuit diagram of a color enhancement processor and a vector counter rotator circuit suitable for use in the system of FIG. 1.
Figure 5:
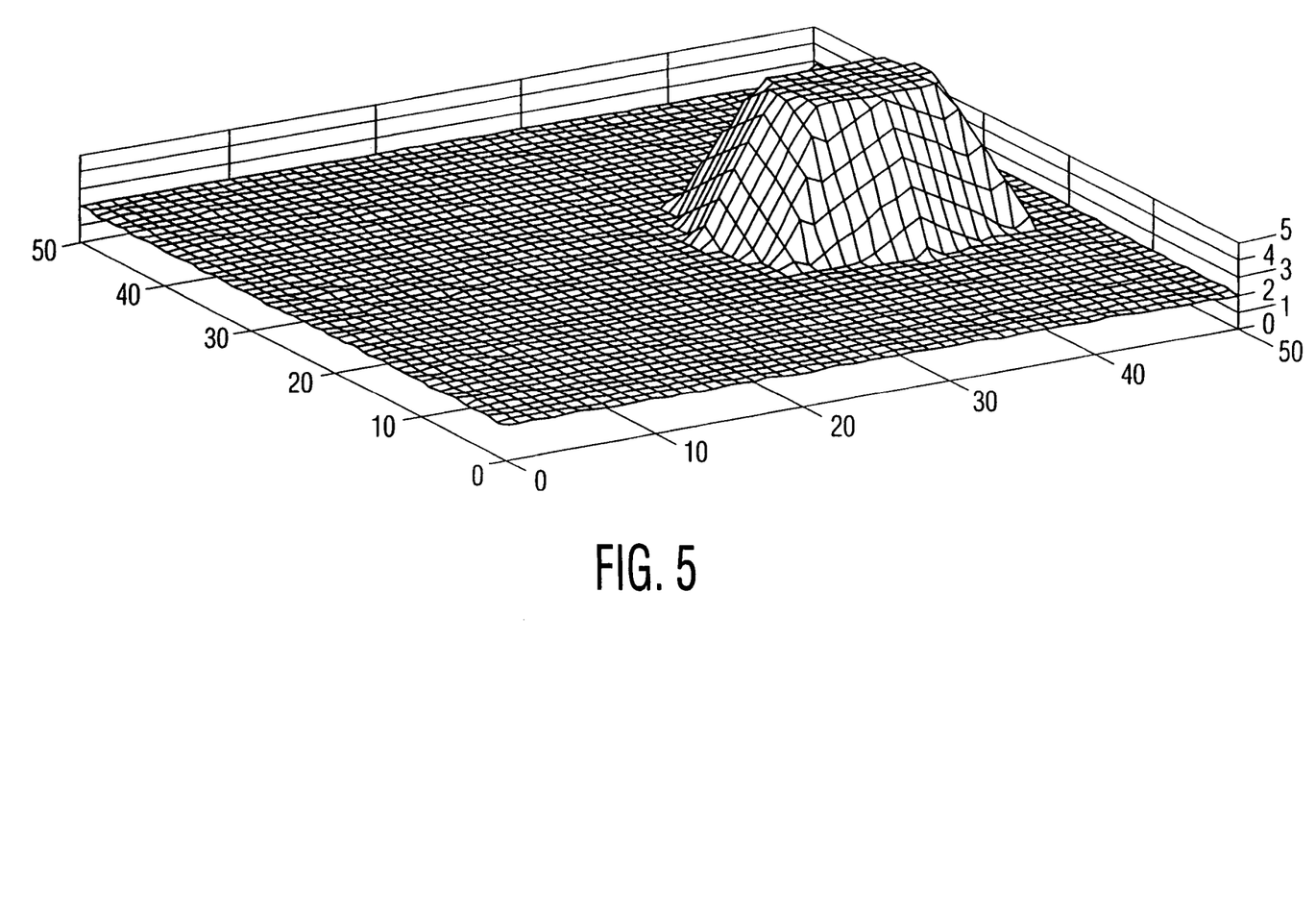
FIG. 5 is a three dimensional diagram illustrating the effects of the auto flesh tone aspects of the invention.
Figure 6:
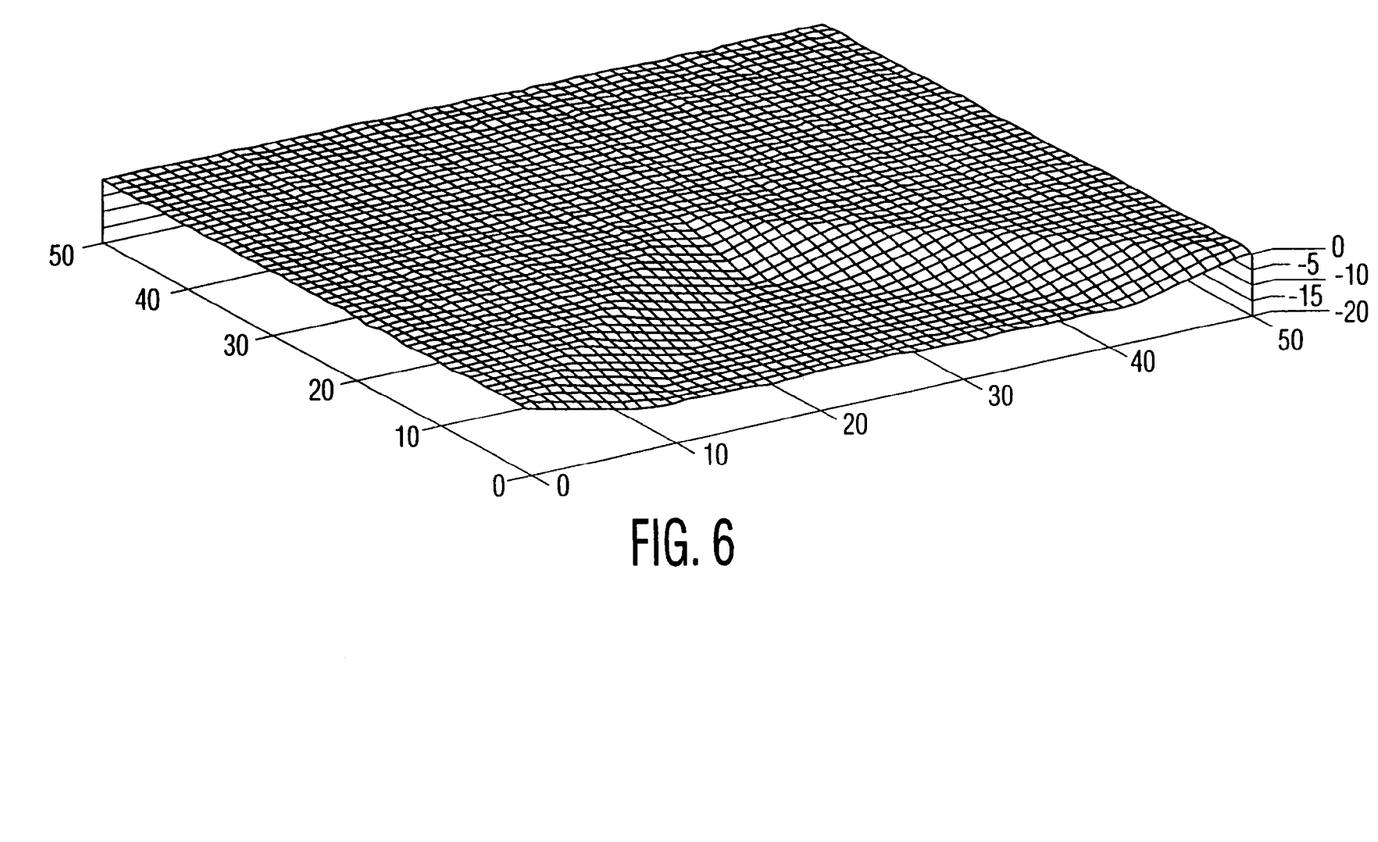
FIG. 6 is a three dimensional diagram illustrating the effects of the auto green tone aspects of the invention.
Figure 7:
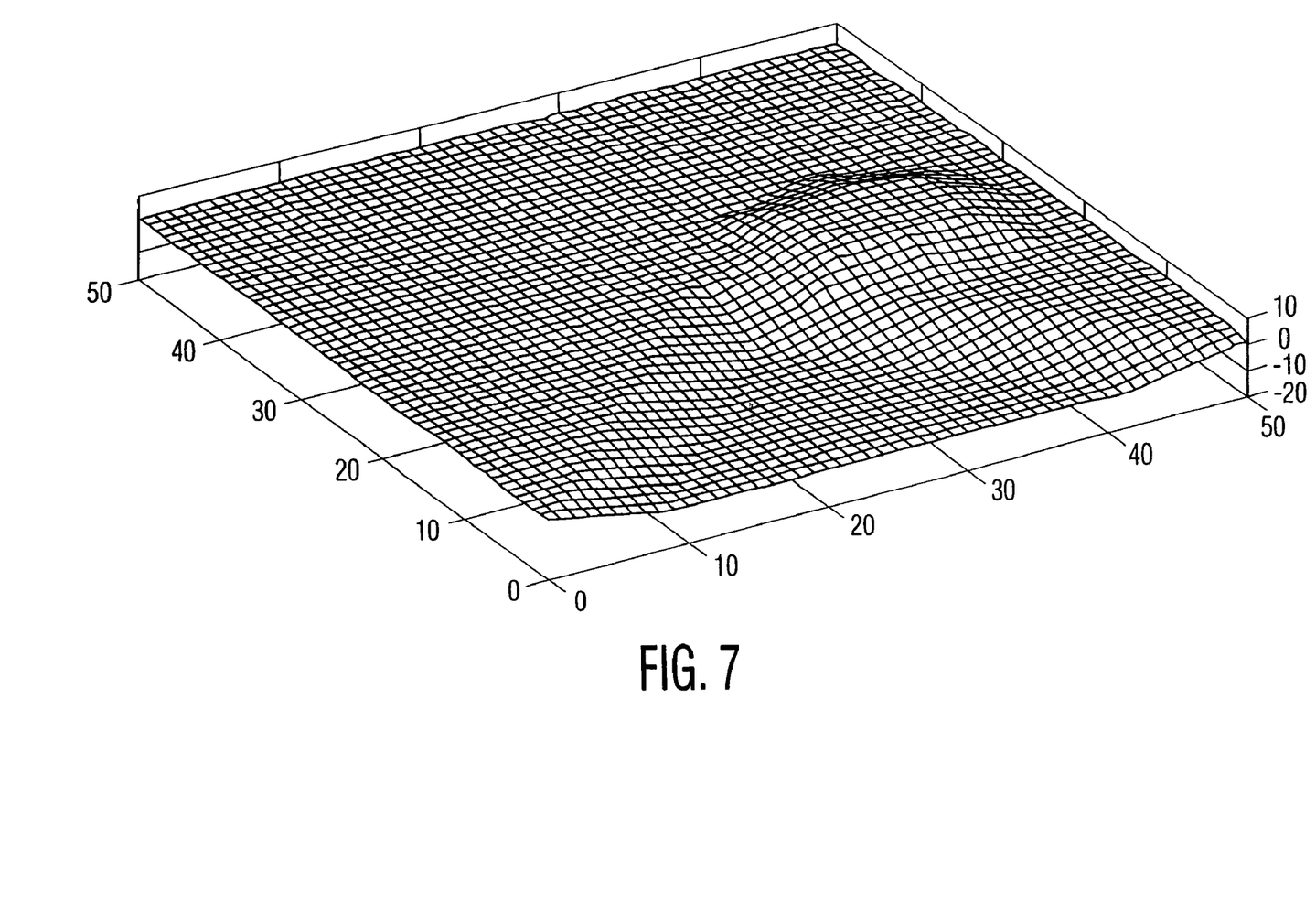
FIG. 7 is a three dimensional diagram illustrating the combined auto flesh tone and green tone aspects of the invention.
Figure 8:
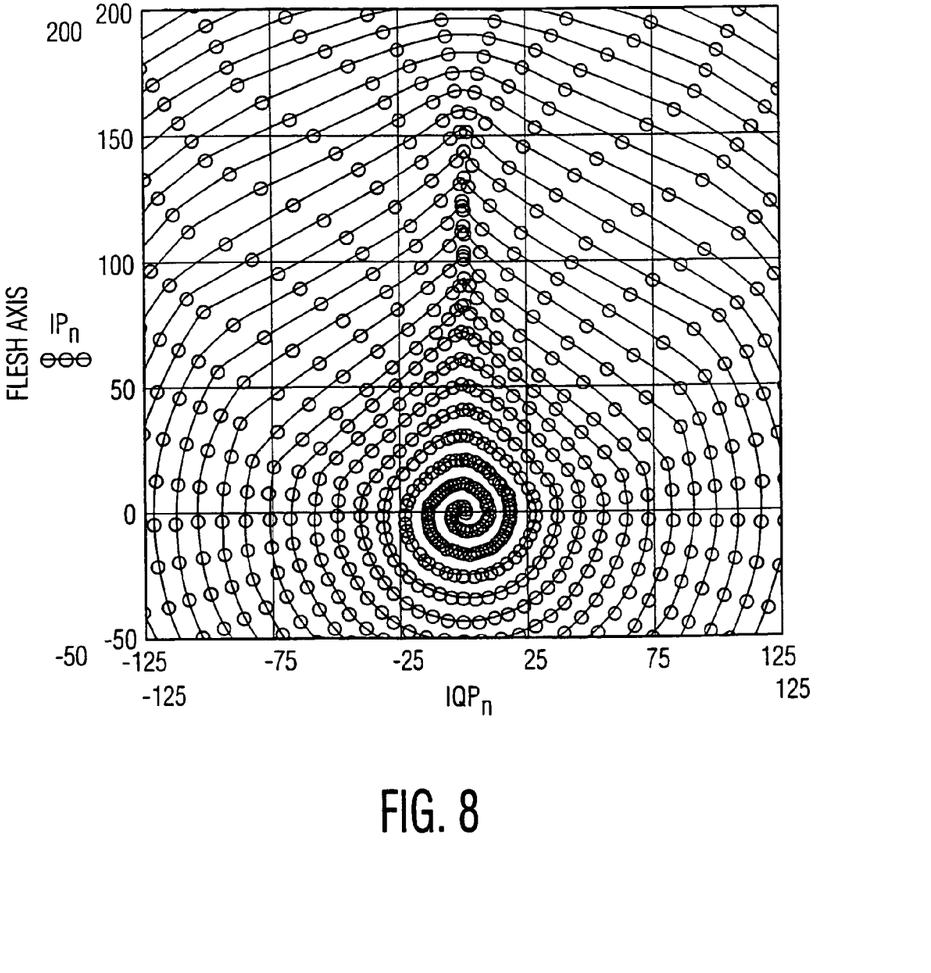
FIG. 8 is a diagram illustrating the performance of the auto flesh tone correction employed in the invention.
Figure 9:
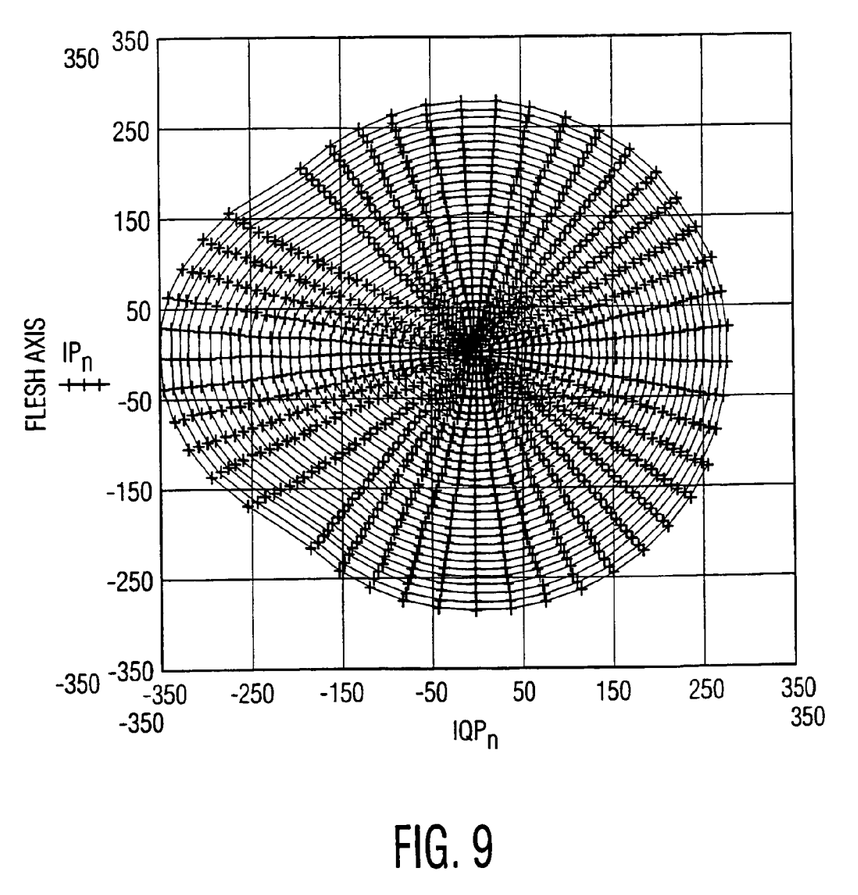
FIG. 9 is a diagram illustrating the performance of the auto green tone enhancement circuitry employed in the invention.
Figure 10:
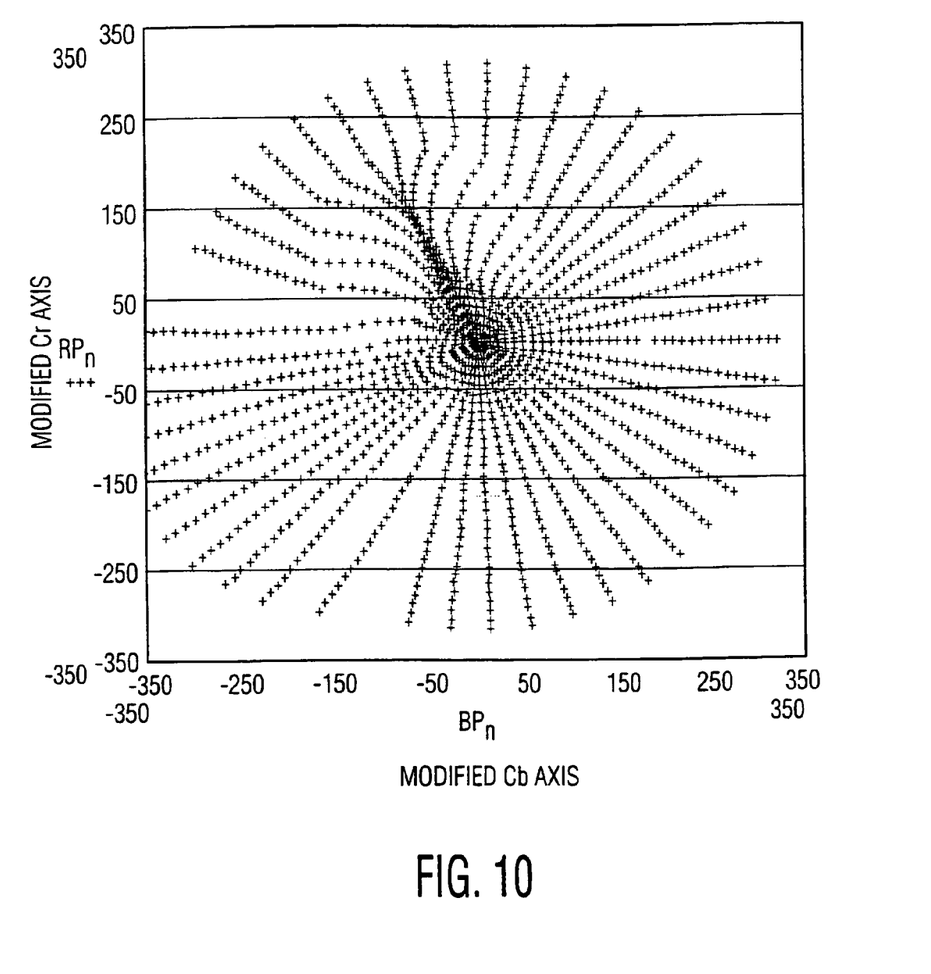
FIG. 10 is a diagram illustrating the combined performances of the auto flesh tone and auto green tone enhancement aspects of the invention.

Signals Zf and Zg are applied to respective inputs of color enhancement processor 80 along with the multiplexed I-IQ signals from vector rotator 20. Color enhancement processor 80 modifies the magnitude (and phase) of the color signals by combining the two control signals and applying the combined signals (Zf and Zg) to a complex multiplier along with the multiplexed I-IQ signals to provide a multiplexed I-IQ output signal in which flesh tones are enhanced and foliage contrast is improved. FIG. 4 shows exemplary circuit details of processor 80. The effects on the color space are shown in FIGS. 5, 6 and 7. In FIG. 5 the flesh tone correction is seen to be flat-toped at a level of about +5 IRE units, in FIG. 6 the green correction is seen to provide a boost along the IQ direction. FIG. 7 illustrates the combined effects of FIGS. 5 and 6. FIG. 8 provides a two-dimensional view of the effect of auto flesh control signal generator 60, which illustrates the color vectors are focused along the flesh axis IPn (i.e., concentrated) and in FIG. 9, which illustrates that the green tones along the IQPn axis tend to have substantial amplitude enhancements. FIG. 10 shows the combined effects wherein flesh tones near the flesh tone axis are concentrated and green tones (foliage) near the quadrature flesh tone axis are amplitude enhanced.

The final step in the color signal processing comprises applying the processed enhanced output signal (multiplexed I-IQ) to color space de-matrix circuit 90. Circuit 90 receives rotation control signal R from vector rotation control register 30 and rotates the phase angles of the enhanced signals Cr*-Cb* back into alignment with the original phase angle of the multiplexed signals Cr-Cb for further processing if needed. Details of color space de-matrix circuit 90 are shown in FIG. 4 and discussed further below.

Figure 2:
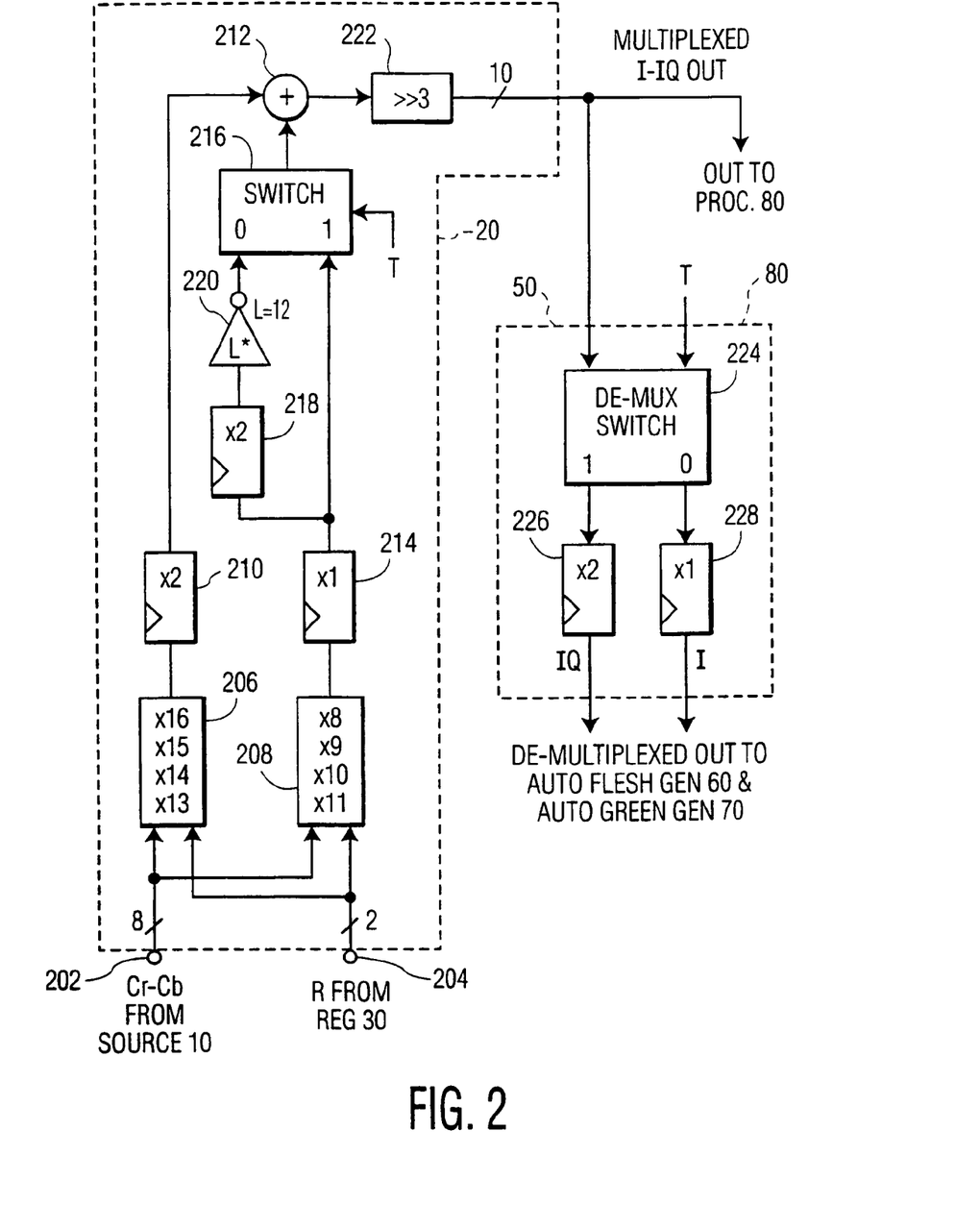
FIG. 2 is a detailed exemplary circuit diagram of a vector rotator and a demultiplexer suitable for use in the system of FIG. 1.
Figure 3:
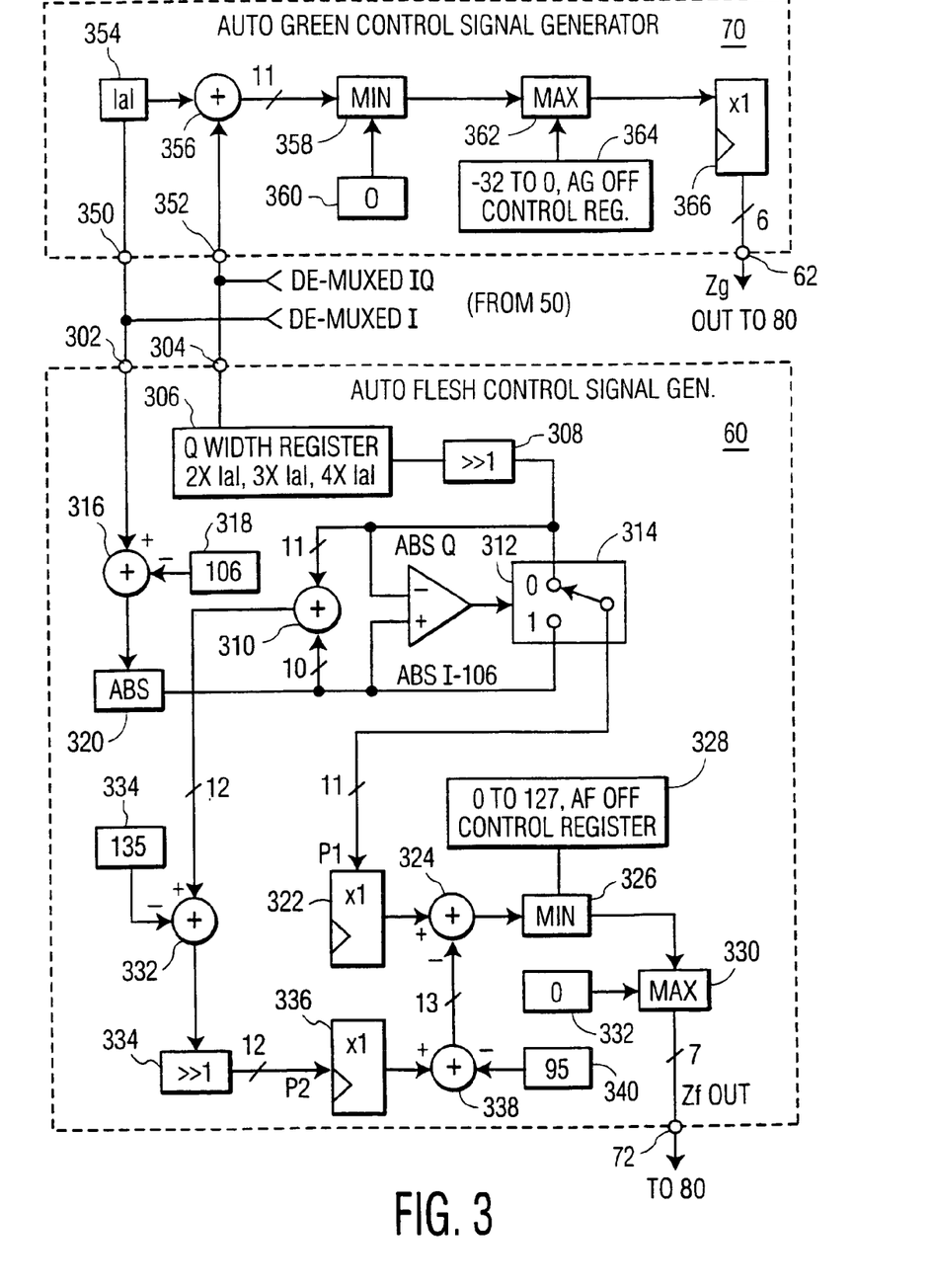
FIG. 3 is a detailed exemplary circuit diagram of an auto green control signal generator and an auto flesh control signal generator suitable for use in the system of FIG. 1.

Before considering the details of the exemplary circuits of FIGS. 2, 3 and 4, it is believed helpful to briefly review some of the previously mentioned concepts of the invention. In this connection, the present inventors have found that in a multiple input receiver it is most appropriate, in terms of architectural simplicity and efficiency, to place the video enhancement circuitry behind the various source selection switch points so that any signal regardless of its origin can take full advantage of the features offered. For this reason, the digital color space enhancement features of the present invention are performed in the digital component signal path where the color information is carried by the digital color difference signals Cr and Cb. This is done in the example of FIG. 1 as discussed above. At this point in the digital signal processing path, the video color information is encoded in a multiplexed 8-bit form in which the digital color difference signals Cr and Cb are presented as a pair of rectangular coordinates which correspond to the color space represented by standard display phosphors. For a full description of the color systems and colorimetries defined by the NTSC and the ATSC standards, reference is made to standards documents SMPTE-170M and ITU-R 709.

One goal of the auto-flesh feature of the present invention is to provide a more consistent rendition of flesh tones. This is very important because the human psycho-optical system is very sensitive to hue variations near the flesh axis and flesh tones which are either too red, too green, or too pale are quite objectionable to most television viewers. To implement the auto-flesh feature of the invention, vector rotator 20 first rotates the input color space, represented by the multiplexed Cr-Cb signals, to an intermediate I-IQ color space so that chroma vector phase relative to the I (flesh) axis and the IQ (quadrature flesh) axis can be determined. This color space rotation is accomplished by the "Cr-Cb to I-IQ Color Space Matrix" of vector rotator 20. The amount of rotation is programmable via the 2-bit vector rotation control register 30. When the register value is "0" the resulting color space rotation is −116.6 degrees. When the register value is "1" the rotation is 121.0 degrees. When the register value is "2" the rotation is 125.5 degrees and when the register value is "3" the rotation is 130.2 degrees. Note that these angles correspond to the scaled Cr-Cb color space (refer to ITUR rec. 709 for details). They are equivalent to angles of 110, 114, 118 and 123 degrees, respectively in un-scaled color difference vector space.

With regard to flesh tone correction, control signal Zf produced by control signal generator 60 is used to automatically change the magnitude and phase angle of any given input chroma vector that lies in the region represented by the non-zero Zf values shown in FIG. 5. Control register 30 is used to program three different widths for the auto-flesh axis. If an input chroma vector is within this region then the resulting non-zero sum Zf value is multiplied by the corresponding I and IQ components of color enhancement processor 80.

The goal of the auto green feature of the invention (including both green boost and green phase compensation) is to provide better color contrast in the green region of displayed images. This is very desirable because foliage or nature scenes in conventionally processed video typically have poor color separation between brown and green. Tree branches and tree trunks, for example, often have a greenish appearance while leaves and grass often are poorly saturated, resulting in scenes with very little overall color separation. The green boost provided in the present invention desirably increases the saturation of greens in leaves while the green phase compression decreases the green tint in tree trunks and branches.

Advantageously, to implement this auto green function, the apparatus of the present invention uses much of the same hardware that might be used for an auto-flesh feature, resulting in an enhancement feature which is very low cost in the sense that both functions are implemented with common hardware (i.e., a common multiplier for hue). After the input color space is rotated to the intermediate I-IQ color space by the Cr-Cb to I-IQ color space, auto green control signal generator 70 generates the auto green control signal, Zg, as discussed above. Signal Zg is then added to auto-flesh control signal Zf in color enhancement processor 80 where it is used to change the magnitude and phase of chroma vectors that lie in a region that lies on either sides of the −IQ (green) axis. This region is represent by the non-zero values of signal Zg in FIG. 6.

Because the present digital color space enhancement apparatus operates on time multiplexed Cr-Cb samples, it can perform complex multiplication using only a single 10-bit by 7-bit multiplier. However, this simplification requires very accurate control of the color difference sample timing throughout the entire circuit. For this reason, all clocked signal delay registers are shown in the detailed diagrams of FIGS. 2–4. Each clocked signal register is labeled, as discussed above, with the specific number of clock cycles for which the signal is held at that particular point in the signal path.

After color enhancement processor 80, the modified I-IQ color space is rotated back to the original Cr-Cb color space by vector counter rotator 90. The rotation control register 30 is used to determine the appropriate amount of rotation needed to return to the original Cr-Cb phase.

As shown in FIGS. 5 and 8, the auto-flesh feature has a response which diminishes with increasing magnitude beyond a threshold. Advantageously, this response has been found to be desirable from the standpoint that flesh tones tend to be grouped near mid-range saturation, therefore, limiting the auto-flesh operation to lesser saturated flesh tones helps to reduce the undesired distortion of non-flesh tone colors. In a similar way, the present auto-flesh implementation generates control signal Zf, which is a function of increases along the I axis, reaching a maximum value around ⅜ Imax and then decreases back to a value of zero at just below ¾ of Imax. Also, the magnitude of Zf is limited to a maximum value which is determined by the AF control register. The area in I-IQ space over which auto-flesh control signal generator 60 operates (non-zero Zf values) is an octagonal region that approximates an oval with its major axis centered on the line IQ=0 (see FIG. 8) and its major axis is approximately at I=⅜, Imax. The resulting auto-flesh performance is superior to the prior art discussed above in that it provides a compression in the range of flesh tones (thereby eliminating flesh tones that are either too red or too green) while at the same time causing very little distortion of non-flesh tone colors such as yellow and yellow-green. Prior art auto-flesh circuits tend to distort these colors, causing foliage scenes to appear significantly more brown and therefore less vibrant. FIGS. 5 and 8 shows the resulting alteration of the I-IQ color space by the auto-flesh portion of the enhancement apparatus of the present invention. Note that the region of altered magnitude and phase is limited to the area over which Zf is not equal to zero.

In addition to changing the phase of vectors near the flesh axis, the apparatus also increases the magnitude for chroma vectors below 50% saturation, which are near the flesh axis. This reduces the washed-out appearance of people when the chroma to luma ratio is very low, and thus, lessens the viewer's perception that the color setting needs to be increased. The magnitude boost for low flesh tone vectors can be seen in FIG. 8.

Considering now the green enhancement features of the invention, it is herein recognized that enhancing the richness of green colors results in a perceived improvement of a program's color rendition. Pursuant to this observation, the auto green feature of the invention has been added to the apparatus and, advantageously, this feature may be obtained with very little additional hardware. More specifically, since the IQ, or quadrature flesh, axis is very nearly coincident with the green axis, auto green control signal generator 70 can use the inter-mediate I-IQ color space that is generated for auto-flesh purposes. FIG. 6 shows a three dimensional plot of the auto green control signal, Zg, which is produced by green control signal generator 70. Here, the +G (green) axis is equivalent to −IQ and the +GQ (quadrature green) axis is equivalent to +I. Like Zf, Zg is a function of both chroma vector magnitude and chroma phase. Its magnitude increases from zero as the chroma vector phase approaches the +G(−IQ) axis and also increases from zero as the chroma vector magnitude increases. Its magnitude is limited to a maximum value, which is set by AG-off control register 62. FIG. 9 shows the resulting alteration of the I-Q color space by the apparatus of the present invention. The region of altered magnitude and phase is limited to the area over which Zg is not equal to zero. FIG. 7 is a three dimensional plot of both Zg and Zf in the I-IQ color space and FIG. 10 shows the combined effect of Zf and Zg on the Cr-Cb color space.

FIGS. 2, 3 and 4 are illustrative detailed circuit examples suitable for use in the apparatus shown in FIG. 1. FIG. 2 presents suitable circuit implementations of vector rotator 20 (Cr-Cb to I-IQ Color Space Matrix) and de-multiplexer 50. FIG. 3 presents suitable examples of auto-flesh control signal generator 60 and auto green control signal generator 70. FIG. 4 provides exemplary examples of color space enhancement processor 80 and vector counter rotator 90.

In FIG. 2, vector rotator 20 includes input 202 for receiving the multiplexed chrominance difference signals Cr-Cb from source 10 (e.g., 8 bits, two's complement form) and a further input 204 for receiving rotation control signal R (e.g., 2 bits) from vector rotation control register 30. These signals are each applied to a pair of programmable multipliers 206 and 208, which have ascending and descending orders of multiplication. In this example, there are four such multiplication steps as follows. When rotation control signal R is binary 00, multiplier 206 multiplies signal Cr-Cb by a factor of 13 and multiplier 208 multiplies signal Cr-Cb by a factor of 11 whereby the ratio of the output signals produced equals 13/11 times in original Cr-Cb value. As previously explained, this corresponds (after further processing) to a vector rotation of Cr-Cb when signal R is "00" of −116.6 degrees. When signal R=01, the multiplication factor is 14/10 for multipliers 206 and 208, respectively, providing a rotation of 121.0 degrees. When signal R=10 the angle of rotation is 125.5 degrees and when signal R=11 the angle is 130.2 degrees. These values are relative to a scaled Cr-Cb color space under ITU-R 709 and correspond to angles of 110, 114, 118 and 123 degrees in un-scaled color difference vector space.

To complete the vector rotation of the multiplexed Cr-Cb samples, the output of programmable multiplier 206 is applied via 2 sample clocked delay unit 210 to a first input of adder 212. The output of programmable multiplier 208 goes to adder 212 via a switched signal path under the control of the timing signal T to ensure that adder 212 only adds scaled Cr values when signal T is low (binary zero) and only adds scaled Cb values when signal T is high (binary one). The switched signal path that provides this function comprises one-sample clocked delay 214 that delays the output of programmable multiplier 208 by one sample period (X1). When signal T=1, switch 216 couples the output of delay 214 to the second input of adder 212. When signal T=0 (signifying Cr present), switch 216 couples the output of delay 214 to adder 212 via 2 clock delay unit 218 and series connected unit 220 to the second input of adder 212. Unit 220 limits the output of delay 218 with a limiting value L* equal to L=12 bits. This prevents overflow of the adder output. The difference in delays 210 and 214 ensures that only previous Cr samples are added to current Cr samples and only previous Cb samples are added to current Cb samples. The output of adder 212 is shifted right by 3-bits by 3-bit shift circuit 222 to provide a 10-bit processed output signal in which the Cr-Cb signal from source 10 is rotated by the angles noted above to align with the I-IQ color space. As previously explained, the specific angle of rotation is controlled by register 30 and programmable multipliers 206 and 208 to take into account differences in the phase angles of the multiplexed Cr-Cb signals in a given system application.

The multiplexed and rotated I-IQ output signals of vector rotator 20 are substantially aligned with the flesh tone axis and the green tone axis of displayed scenes, which advantageously simplifies further color processing. The output of vector rotator 20 in multiplexed form is applied directly to an input of color enhancement processor 80 but is first be de-multiplexed for input to control signal generators 60 and 70. This function is provided by demultiplexer 50 which comprises de-mux switch 224 controlled by the timing signal T, which receives the output of shifter 222, and outputs a demultiplexed IQ signal via two sample delay 226 and a de-multiplexed I signal via one sample delay 228. These demultiplexed I and IQ signals are then applied as inputs to control signal generators 60 and 70 for generation of flesh tone Zf and green tone Zg control signals which are applied to color enhancement processor 80.

FIG. 3 provides exemplary circuit details of control signal generators 60 and 70 suitable for implementing the present invention. The demultiplexed I (flesh tone) signal and the demultiplexed IQ (quadrature flesh tone or green) signals from demultiplexer 50 are applied to respective inputs 302 and 304 of the auto flesh control signal generator 60. The IQ signal at terminal 304 is applied to a Q width register 306 which multiplies signal IQ by 2, 3 or 4 and takes the absolute value (symbol "IaI") thereof and right shifts the absolute value by 1 bit in shifter 308. The multiplier values, preset in unit 306, determine the angular width of the flesh tone correction zone (e.g., shown in FIGS. 5, 7, 8 and 10). Selecting a multiplier value gives one the option of narrow, medium or wide vector angles in which flesh tones are "recognized" and enhanced. The output of shifter 308 (11 bits, the absolute value of IQ) is applied to a first input of adder 310, to an inverting input (−) of comparator amplifier 312 and to a "0" input of switch 314 that is controlled (switched) by the output of comparator amplifier 312. The demultiplexed "I" signal at terminal 302 is applied to adder 316, which receives a negative constant "106" from register 318 and so subtracts "106" from the I signal and the absolute value of the result is applied to absolute value circuit 320. This signal (10 bits as shown) is then applied to the second input of adder 310, to the non-inverting input (+) of comparator amplifier 312 and to the "1" input of switch 314.

The remainder of auto flesh control signal generator 60 provides final scaling of the width and amplitude (and on/off control) of the auto flesh control signal AF supplied at output 72 to color enhancement processor 80. Specifically, the 11 bit output of switch 314 is coupled via a path including clocked delay unit 322, which provides a delay of 1 sample to a summing input (+) of adder 324 the output of which is applied via minimum value circuit 326 (having a minimum set by a register 328) and maximum value circuit 330 (having a maximum value set by a register 332) to provide a (7 bit) output signal, Zf OUT, to output 72 for application to color enhancement processor 80.

The output of adder 310 follows a path in which the 12 bit signal of adder 310 is applied to positive (+) input of adder 332 which receives the output of constant register 334 at an inverting input (−) thereof and thus subtracts the stored constant "135" and provides and output, shifted in (right) shifter 334, that comprises a 12 bit result. This is then delayed by delay unit 336 and is applied to the summing input (+) of adder 338 that subtracts a constant ("95" supplied from register 340) to provide a 13 bit signal to a subtractive input of adder 324.

The auto flesh control feature of the invention may be turned ON or OFF by means of register 328 or, when turned on, register 328 provides the minimum amplitude of auto flesh activation. The other constants provided by registers 318, 334, 340 and 332 control angular width and amplitude ranges of the flesh tone correction signal. The exemplary values shown result in the responses shown in FIGS. 5, 7, 8, and 10 as previously discussed.

Auto green control signal generator 70 provides contrast enhancement of foliage scenes. This feature is accomplished with minimal additional hardware in a system already containing auto flesh compensation. This results because the auto green feature may be implemented with the same color enhancement processor 80 that is used for the auto flesh feature.

Of course, in a given application, the auto flesh feature may be deleted and one may still obtain the advantage of the enhanced green contrast of the present invention which improves the rendition of foliage by emphasizing greens so as to improve the green/brown contrast.

Advantageously, the foliage color improvement in the present invention is achieved with auto green control signal generator 70 by circuitry which is much less complex than that required in generator 60 for auto flesh correction. Further, as previously noted, in the combined auto flesh auto green arrangement of the present invention, there is provided a substantial reduction in the overall circuit complexity by the sharing of scaling and complex multiplication functions in color enhancement processor 80 which is shared by control signal generators 60 and 70.

In more detail, auto green control signal generator 70 in FIG. 3 comprises input 350 to which the de-multiplexed signal I is applied and input 352 to which the demultiplexed signal IQ is applied. Input 350 is applied via absolute value circuit 354 to one input of adder 356, the other input of which is coupled to input 352 for receiving the signal IQ. The (11 bit) output of adder 356 is applied to minimum value circuit 358 which limits the output thereof to zero provided by register 360. The resultant limited minimum value signal is provided to maximum value circuit 362 having a maximum output signal value limited by control register 364 to a range from −32 to 0 or to AG off (auto green off). Register 364 controls the amount of foliage contrast enhancement from none at all (AG off) to a range in values up to a predetermined maximum. After auto green control signal generation the output of maximum value circuit 362 is delayed by one sample unit in delay unit 366 and the resultant (6-bit) signal is outputted (at terminal 62) for application to the color enhancement processor 80, wherein the rotated, multiplexed I-IQ signals and control signals Zf and Zg are combined to provide a multiplexed color enhanced signal of the processed components I and IQ.

FIG. 4 provides details of color enhancement processor 80 and vector counter-rotator 90. Processor 80 combines, scales, and applies appropriate shift and delay operations and constants so as to produce a processed output signal I-IQ in which both flesh tones and foliage contrast are enhanced as previously described. Vector counter rotator 90 returns the vector phase angles to their original values to provide a processed multiplexed Cr-Cb output signal in the original format which is suitable for further digital signal processing as desired.

Color enhancement processor 80 includes input 402 for receiving control signal Zg provided by auto green control signal generator 70, input 404 for receiving control signal Zf provided by auto flesh control signal generator 60, input 406 for receiving the multiplexed and rotated I-IQ signals from vector rotator 20, and output 408 for providing an auto-flesh and auto green corrected output signal in multiplexed form I-IQ aligned with the flesh tone and green tone axis. Color enhancement processor 90 rotates the angle of the resultant processed output signal I-IQ back to the original angle thus reversing the initial rotation provided by vector rotator 20.

In color enhancement processor 80, signals Zf and Zg are combined in first adder 410 and applied to first input "1" of multiplex switch 412 via a path including inverter 414, one-bit right shifter 416 and one sample delay 418. The "1" input of multiplex switch 412 is selected under the control of timing signal T when signal Cb is present. Signal Zg is shifted right by 2 bits in shifter 420 and is combined with signal Zf in adder 422 and the sum thereof is coupled to the second ("0") input of switch 412 via a path including right shifter 426 that provides a four bit right shift and clocked delay unit 428 that provides a delay of two clock periods. The output "0" of multiplex switch 412 is selected when signal Cb is present from source 10. The output of switch 412 is then scaled up by means of adder 430 which adds a constant "64" provided by register 432. The output of adder 430 (7 bits, unsigned) is then applied to one input of complex multiplier 434 which receives at its other input the multiplexed I-IQ signal provided from input 406 and delayed by 4 sample intervals by a clocked delay unit 436. The resultant 17 bit output signal of complex multiplier 434 is then coupled to output terminal 408 via 6-bit right shifter 438 and 2 sample clocked delay unit 440 to thereby provide at output 408 the rotated, multiplexed, flesh and green tone processed output signal I-IQ.

Vector counter rotator 90 includes input 450 for receiving the output signal of color enhancement processor 80, input 452 for receiving the 2-bit rotation control signal R from register 30 and output 454 for providing a multiplexed and enhanced color signal Cr-Cb out which has been rotated back to its original position. The construction and operation of rotator 90 is similar to that of rotator 20 but differs, for example, in that the direction of rotation is reversed to thereby return the processed I-IQ vectors to the color space of the original unprocessed Cr-Cb vectors. Other differences include a small change in limiting values to allow for the enhanced amplitude of the green signal that improves foliage contrast.

In vector counter rotator 90, the processed color and rotation signals at terminals 450 and 452 are applied to two programmable multipliers 456 and 458, which select one of four rotation angles. As in the example of FIG. 2, the rotation angles are 116, 121, 125.5 and 130.2 degrees for the four binary values of the rotation control signal R.

To complete the rotation, the output of multiplier 456 is applied via two sample clocked delay 460 to a first input of adder 462. The output of programmable multiplier 458 goes to adder 462 via a switched signal path under the control of the timing signal T to ensure that adder 462 adds only scaled Cr values when signal T is low and scaled Cb values when signal T is high (binary one). The switched signal path comprises one-sample delay 464 that delays the output of multiplier 458 by one sample period. This delayed signal is then applied via 15-bit limiter 466 and delay 468 to respective inputs "1" and "0" of switch 470 controlled by timing signal T. When signal T is zero, switch 470 couples the output of multiplier 458 to adder 462 via delays 464 and 468. Otherwise (signal T=1), the coupling is via delay 464 and limiter 466. Limiter 466 provides a 15-bit limit to prevent overflow in adder 462.

The output of adder 462 is coupled to the system output terminal 454 via a path including a series connection of 4-bit right shifter 472, two sample clocked delay 474, 10 bit limiter 476 and one-sample clocked delay 478. The shift and limit functions reduce the bit length from 16 bits at the output of adder 462 to 12 bits at the output of shifter 472 and finally to 10 bits at the output of limiter 476. Note that this is of two bits higher resolution than the original 8-bit Cr-Cb input signal.

The higher resolution of the enhanced color output signal may be of advantage in subsequent processing (e.g., in high definition television systems) or, if not desired in a specific application, it may be reduced by further shifting and limiting operations in units 472 and 476.

It will be apparent to those skilled in the art that although the present invention has been described in terms of an exemplary embodiment, modifications and changes may be made to the disclosed embodiment without departing from the essence of the invention. Therefore, it is to be understood that the present invention is intended to cover all modifications as would fall within the true scope and spirit of the present invention.

The invention claimed is:

1. A method for processing video signals, comprising the steps of:
    receiving a color signal; and
    generating first and second signal components from the color signal, the first signal component being substantially aligned with a flesh tone color axis, the second signal component being substantially aligned with a green tone color axis, characterized by
    automatically generating from the first and second signal components a green tone enhancement control signal for increasing the saturation of the color signal around the green tone axis, and
    modifying the first and second signal components to increase the saturation of the color signal around the vicinity of the green tone color axis to provide green tone enhancement in response to the generated green tone enhancement control signal thereby dynamically and continuously improving the contrast of foliage displayed in an image generated from the color signal.

2. The method according to claim 1, characterized in that the modifying step comprises modifying the first and second signal components in a non-linear fashion in response to the automatically generated green tone enhancement control signal.

3. The method according to claim 2, characterized in that the generating step comprises generating the first and second signal components in a multiplexed form.

4. The method according to claim 3, wherein the generating step comprises:
    rotating components of the color signal by a selected one of N predetermined angles to bring the components thereof into alignment with the I and IQ color space axis, and further characterized by the step of:
    counter-rotating the components of the modified color signal by an amount equal to the selected one of said N predetermined angles following green tone enhancement.

5. The method according to claim 4, wherein a rotation control register is used to control the rotation and counter rotation of the first and second signal components.

6. The method according to claim 3, further characterized by the step of:
    modifying the first and second signal components to rotate color signals around the vicinity of the flesh tone color axis and within a range of first and second magnitude towards the flesh tone color axis.

7. The method according to claim 6, characterized in that the modifying steps are performed using a common color enhancement processor.

8. A video signal processing apparatus, comprising:
    means (10) for receiving a color signal; and
    means (20), coupled to the receiving means, for generating first and second signal components from the color signal, the first signal component being substantially aligned with a flesh tone color axis, the second signal component being substantially aligned with a green tone color space axis, characterized by
    means (50), coupled to the generating means, for automatically generating a green enhancement control signal for increasing the saturation of the color signal around the green tone color axis, and
    means (60), coupled to the generating means, for modifying the first and second signal components to increase the saturation of the color signal around the vicinity of the green tone color space axis to provide enhanced green tone thereby dynamically and continuously improving the contrast of foliage displayed in an image generated from the color signal.

9. The apparatus according to claim 8, further characterized in that:
    the modifying means comprises means (412,436,430,434, 438,440) for modifying the first and second signal components in a non-linear fashion in response to the automatically generated green tone enhancement control signal.

10. The apparatus according to claim 9, characterized in that the signal component generating means generates first and second signal components in a multiplexed form.

11. The apparatus according to claim 10 characterized in that the generating means comprises:
    means (20) for rotating color signals having components not aligned with the flesh tone axis and the green tone axis by one of N predetermined angles to bring the components thereof into alignment with the I and IQ color space axis, and the apparatus further comprises
    means for counter rotating the components of the modified color signal by an amount equal to the one of N predetermined angles, and
    a rotation control register (30) for controlling the degree of rotation and the counter rotation of the multiplexed color signal and the modified color signal.

12. The apparatus according to claim 11, further characterized by:

means (70) for generating a flesh tone enhancement control signal for compressing flesh tones of the color signal which are overly red or green, wherein the modifying means modifies the magnitude of the color signal in response to the multiplexed color signal, the flesh tone enhancement control signal and the green tone enhancement control signal.

13. The apparatus according to claim 12, wherein the modifying means comprises a common color enhancement processor (80) for providing flesh tone enhancement and green tone enhancement.

\* \* \* \* \*